United States Patent [19]

Kluber

[11] Patent Number: 5,261,690
[45] Date of Patent: Nov. 16, 1993

[54] INFANT STROLLER APPARATUS

[76] Inventor: Paul F. Kluber, 9814 Niagara Ave., Fontana, Calif. 92335

[21] Appl. No.: 901,571

[22] Filed: Jun. 19, 1992

[51] Int. Cl.⁵ .............................. B62B 9/20; B62B 7/06
[52] U.S. Cl. .................................... 280/648; 280/47.4;
   280/47.371; 280/658; 454/151
[58] Field of Search ............... 280/647, 648, 47.35,
   280/47.38, 47.4, 47.371, 47.34, 658, 650, 1.16,
   1.188, 1.189, 1.203, 1.23, 1.5, 641, 642, 30, 7.15,
   7.17, 250.1, 842; 454/146, 151, 143; 296/35.4,
   177

[56] References Cited

U.S. PATENT DOCUMENTS

| | | | |
|---|---|---|---|
| 1,290,936 | 7/1918 | Duckham | 454/146 |
| 1,525,429 | 2/1925 | Hunter | 454/143 |
| 1,530,626 | 3/1925 | Steinmetz | 454/151 X |
| 1,570,410 | 1/1926 | Strauss | 280/47.38 X |
| 1,780,903 | 11/1930 | Berman | 454/151 |
| 2,402,046 | 6/1946 | Holder | 280/7.17 |
| 2,529,994 | 11/1950 | Brezek | 454/151 X |
| 2,939,375 | 6/1960 | Herman | 454/143 X |
| 2,986,400 | 5/1961 | Phillips | 280/7.17 |
| 4,300,783 | 11/1981 | Fisher | 280/30 X |
| 4,886,298 | 12/1989 | Shols | 280/842 |

FOREIGN PATENT DOCUMENTS

| | | | |
|---|---|---|---|
| 0498302 | 1/1951 | Belgium | 280/47.38 |
| 0291381 | 3/1914 | Fed. Rep. of Germany | 280/767 |
| 0498326 | 9/1954 | Italy | 280/7.17 |
| 0088085 | 1/1920 | Switzerland | 280/47.38 |

Primary Examiner—Margaret A. Focarino
Assistant Examiner—Florian Zeender
Attorney, Agent, or Firm—Leon Gilden

[57] ABSTRACT

A stroller structure arranged to simulate 1 racing car configuration for entertainment and amusement of individuals includes a floor having side walls, with the side walls each including an air scoop directed therethrough, the air scoop in pneumatic communication with ventilation apertures through the side walls. A front cowl is mounted to the floor extending rearwardly thereof in adjacency to a seat structure arranged for pivotal mounting to the floor about rear pivot pins. Handle bar structure is arranged for pivotal orientation in a substantially raised first position to a lowered second position to provide for a grip for an infant secured within the seat structure.

4 Claims, 4 Drawing Sheets

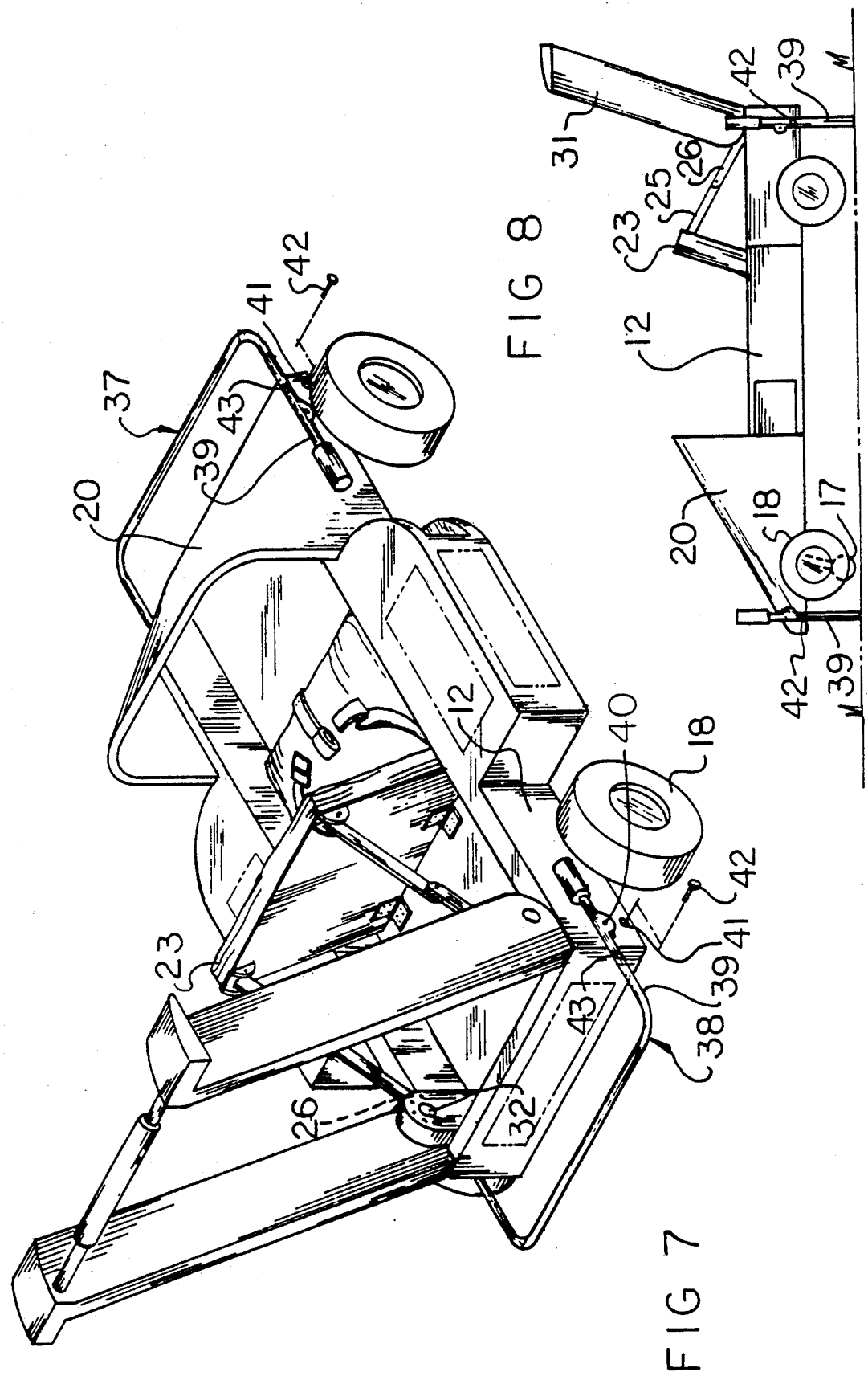

INFANT STROLLER APPARATUS

BACKGROUND OF THE INVENTION

1. Field of the Invention

The field of invention relates to stroller apparatus, and more particularly pertains to a new and improved infant stroller apparatus wherein the same is arranged to simulate race car construction.

2. Description of the Prior Art

Stroller apparatus of various types are utilized throughout the prior art and exemplified in U.S. Pat. Nos. 4,660,850; 4,887,834; 3,874,690; 4,768,795; and 4,989,891.

The stroller apparatus of the prior art has typically been of conventional configuration and use, wherein the instant invention attempts to overcome deficiencies of the prior art by providing for a convenient stroller structure arranged to simulate race car streamlining and accommodation of an infant therewithin.

Accordingly, it may be appreciated that there continues to be a need for a new and improved infant stroller apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of stroller apparatus now present in the prior art, the present invention provides an infant stroller apparatus wherein the same is arranged to simulate race car construction. As such, the general purpose of the present invention, which will be described subsequently in greater detail, is to provide a new and improved infant stroller apparatus which has all the advantages of the prior art stroller apparatus and none of the disadvantages.

To attain this, the present invention provides a stroller structure arranged to simulate racing car configuration for entertainment and amusement of individuals, including a floor having side walls, with the side walls each including an air scoop in pneumatic communication with ventilation apertures through the side walls. A front cowl is mounted to the floor extending rearwardly thereof in adjacency to a seat structure arranged for pivotal mounting to the floor about rear pivot pins. Handle bar structure is arranged for pivotal orientation in a substantially raised first position to a lowered second position to provide for a grip for an infant secured within the seat structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant stroller apparatus which has all the advantages of the prior art stroller apparatus and none of the disadvantages.

It is another object of the present invention to provide a new and improved infant stroller apparatus which may be easily and efficiently manufactured and marketed.

It is a further object of the present invention to provide a new and improved infant stroller apparatus which is of a durable and reliable construction.

An even further object of the present invention is to provide a new and improved infant stroller apparatus which is susceptible of a low cost of manufacture with regard to both materials and labor, and which accordingly is then susceptible of low prices of sale to the consuming public, thereby making such infant stroller apparatus economically available to the buying public.

Still yet another object of the present invention is to provide a new and improved infant stroller apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the invention utilizing lift bar structure.

FIG. 8 is an orthographic side view of the stroller apparatus with the lift bars in a lowered orientation to permit lifting of the stroller structure.

DESCRIPTION OF THE PREFERRED EMBODIMENT

Figure 1:
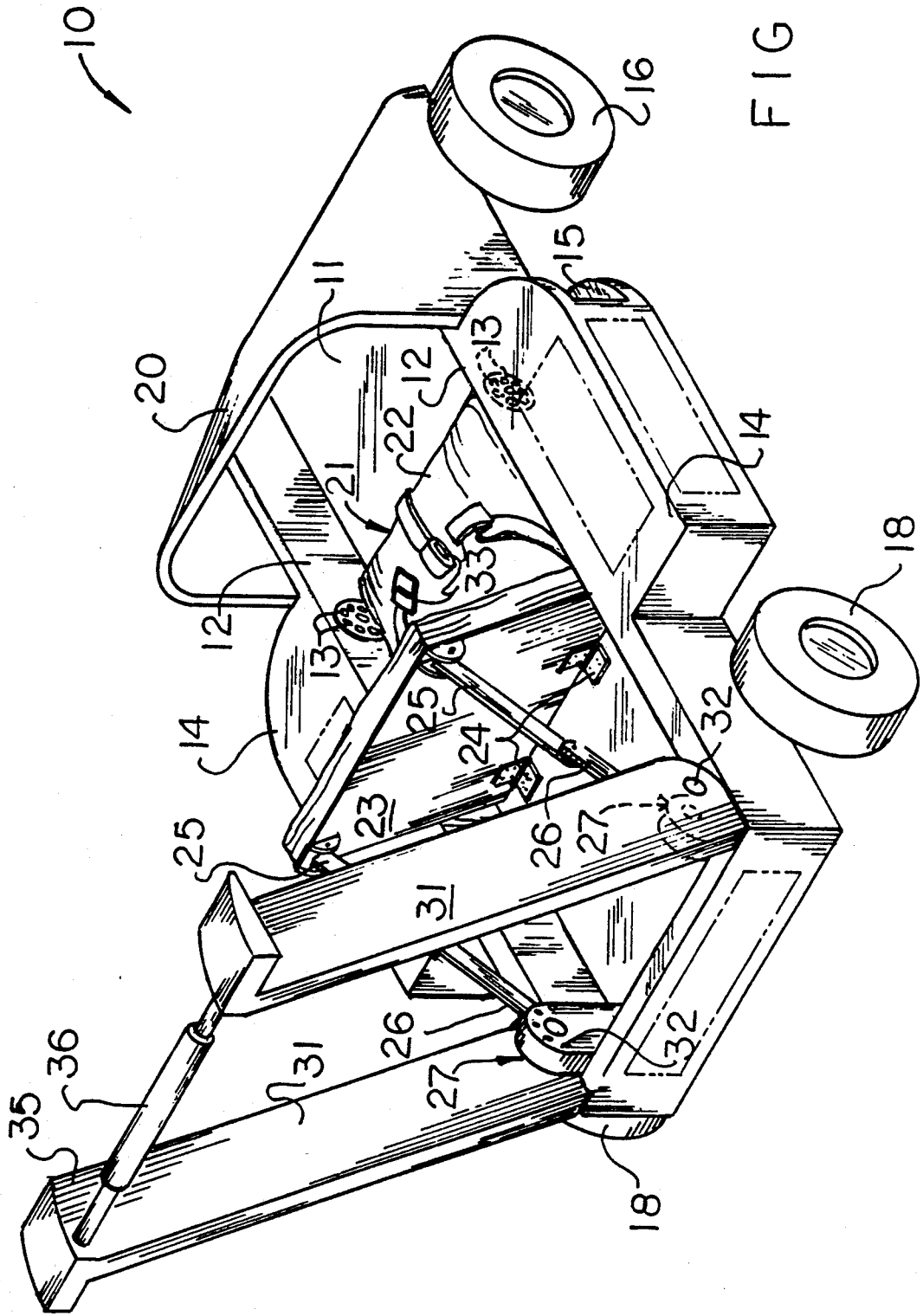
FIG. 1 is an isometric illustration of the instant invention.
Figure 3:
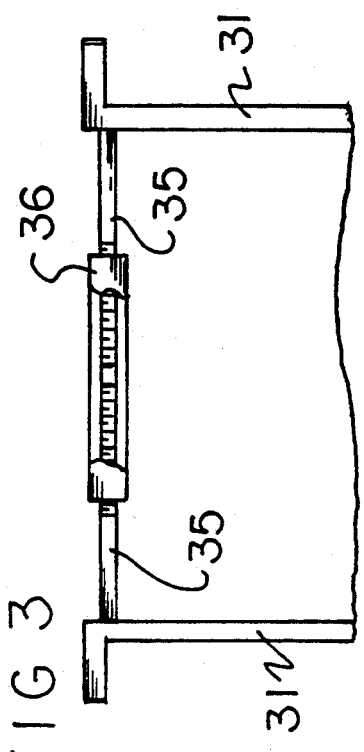
FIG. 3 is an orthographic rear view, partially in section, of the cross brace members mounted within an internally threaded sleeve structure.
Figure 4:
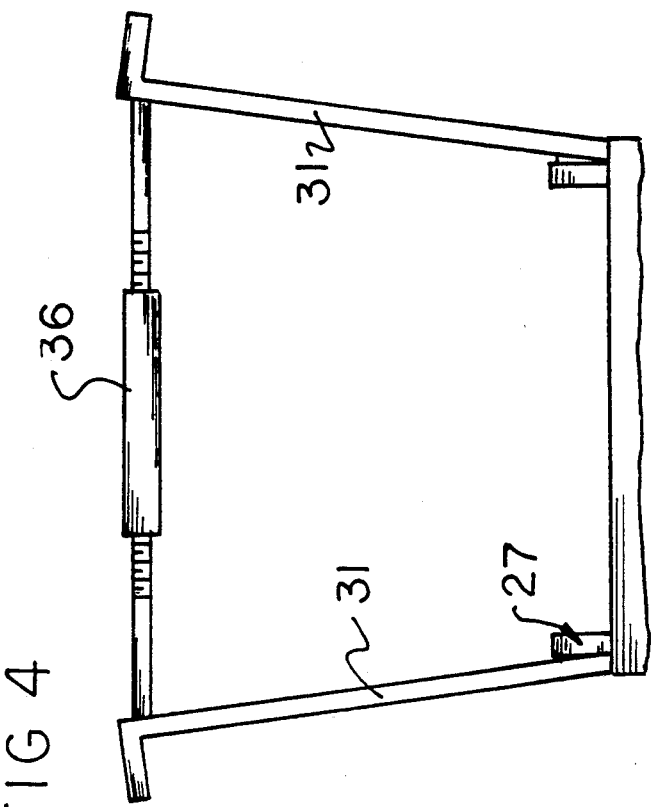
FIG. 4 is an orthographic rear view of the handle bar legs arranged in a spread orientation relative to the sleeve relative to FIG. 3.
Figure 2:
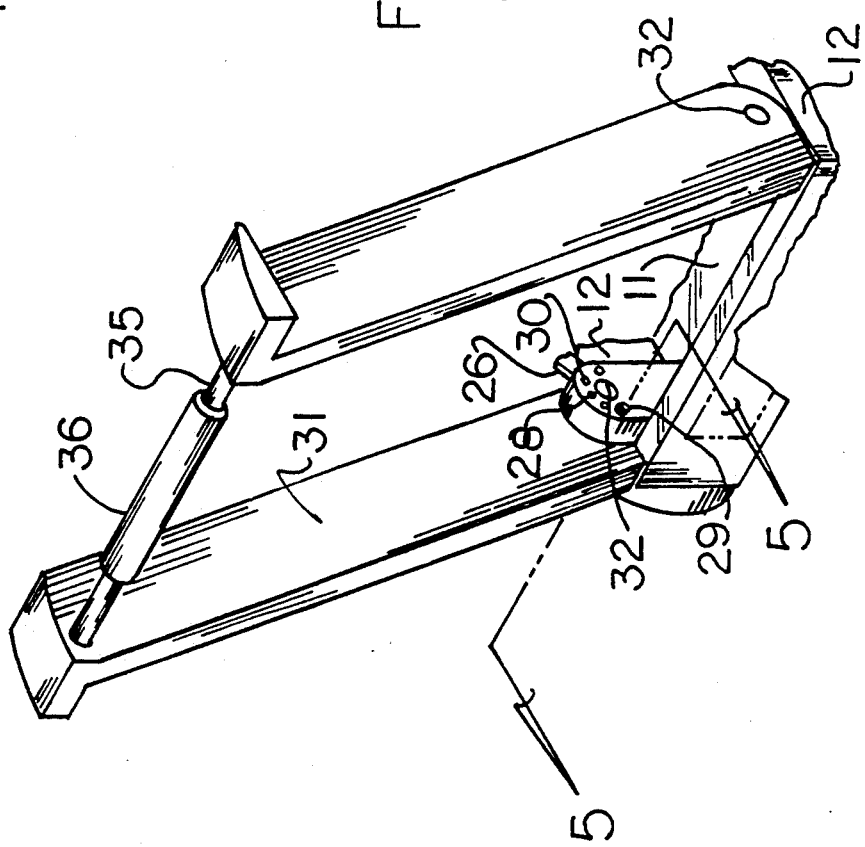
FIG. 2 is an isometric rear view of the handle leg structure and its mounting relative to the body of the stroller structure.
Figure 6:
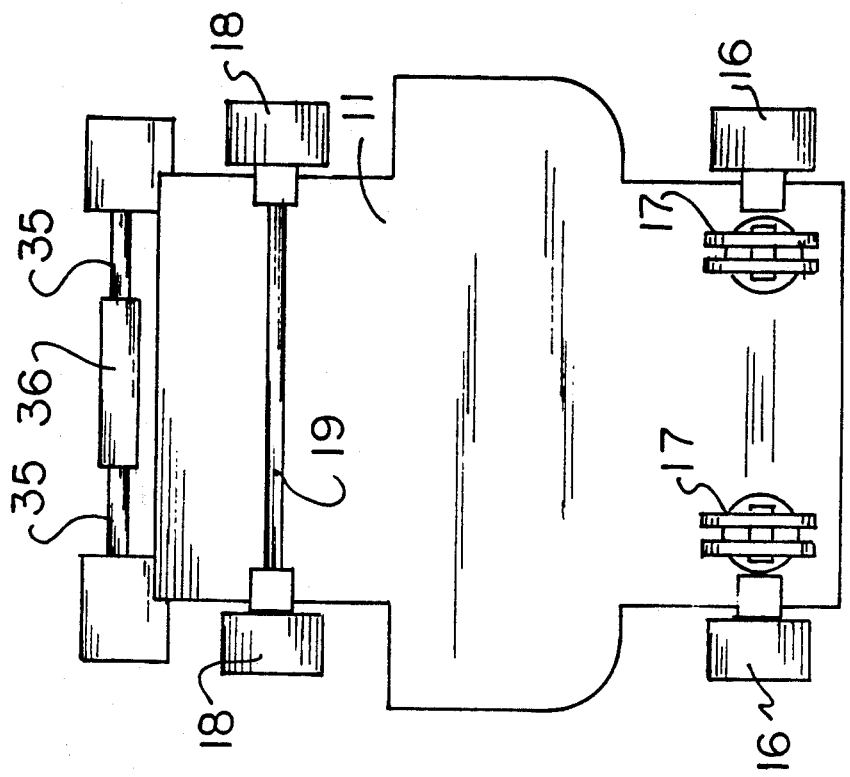
FIG. 6 is an orthographic bottom view of the invention.
Figure 5:
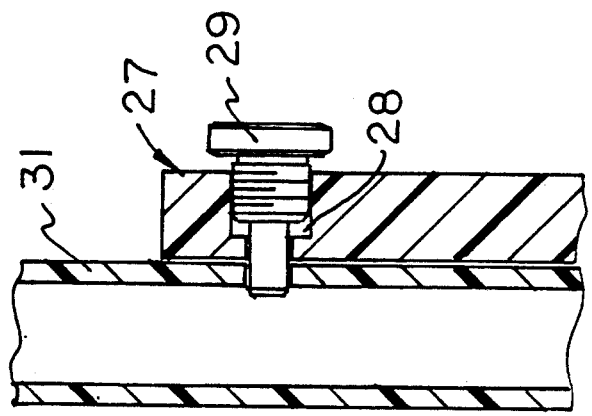
FIG. 5 is an orthographic view, taken along the lines 5—5 of FIG. 4 in the direction indicated by the arrows.

With reference now to the drawings, and in particular to FIGS. 1 to 8 thereof, a new and improved infant stroller apparatus embodying the principles and concepts of the present invention and generally designated by the reference numeral 10 will be described.

More specifically, the infant stroller apparatus 10 of the instant invention essentially comprises a floor 11 having spaced parallel side walls 12 arranged in a parallel coextensive relationship extending upwardly and orthogonally relative to the floor 11. A matrix of ventilation apertures 13 are directed through the side walls 12, with the apertures arranged for pneumatic communication with side wall scoops positioned within side wall scoop housing 14, with each housing 14 having an entrance opening 15 positioned adjacent a respective side wall 12 at a forward distal end of each of the housings to direct air into the stroller structure. Front wheels 16 are mounted rotatably to the side walls, with caster wheels 17 mounted to the floor, with a single caster wheel 17 positioned to extend below a respective and adjacent front wheel 16 to permit ease of steerage of the organization while maintaining simulation of the race car construction. In the event of breakage of the caster wheels or their inoperativeness, the front wheels 16 are rotatably mounted to the side walls accommodate and support the stroller structure.

Rear wheels 18 are mounted about a rear wheel axle 19, with the rear wheel axle 19 orthogonally oriented and extending beyond the side walls 12 (see FIG. 6) to support the car structure in use.

A forward cowl 20 extends from a forward end of the floor 11 rearwardly and above the floor 11 to an orientation adjacent to a stroller seat 21. The stroller seat 21 includes a seat bottom 22 fixedly mounted to the floor 11 extending orthogonally and coextensively between the side walls 12. A seat back 23 is provided having seat back hinges 24 mounting a lower distal end of the seat back 23 to the floor 11. First legs 25 have their forward ends pivotally mounted adjacent an upper distal end of the seat back 23, with rear distal ends of the first legs 25 pivotally mounted to linkage second legs 26. Rear distal ends of the linkage second legs 26 are mounted within a respective pivot head 27. Each pivot head 27 (see FIGS. 2 and 5 for example) includes an annular array of pivot head apertures 28 oriented in a semi-circular orientation about a shock absorbing resilient axle 32. Each resilient axle 32 pivotally mounts a handle leg 31 at a lower distal end of each handle leg 31. Upper distal ends of the handle legs include handle leg cross braces 35 fixedly mounted thereto, with the handle leg cross braces 35 externally threaded and received within an internally threaded sleeve 36. It should be noted that the threads of the opposed cross braces 35 are of opposite threading, whereupon rotation of the sleeve 36 effects selective displacement towards or away from the sleeve during rotation of the sleeve in adjustment of the handle legs towards one another.

Respective first and second lock pins 29 and 30 are each received within one of the pivot head apertures 28. The first lock pin 29 is directed into an adjacent handle leg 31 (see FIG. 5), wherein similarly the second lock pin 30 is directed into the linkage second leg 26. The linkage second leg 26 is pivotally mounted about the resilient axle 32 within the associated pivot head 27, wherein the second lock pin 30 fixedly and angularly orients the second leg relative to the pivot head during use. In this manner, relative pivotment of the seat back 23 is effected by selective positioning of the second lock pin within a respective aperture in the semi-circular array of apertures. A seat belt 33 also is provided of conventional configuration. Further it should be noted that if desired a canopy (not shown) may be mounted and of a type as utilized in the prior art, such as indicated in the U.S. Pat. No. 4,660,850, mounted over the stroller seat 21 to provide for shade protection to an infant contained therewithin. The U.S. Pat. No. 4,660,850 accordingly is incorporated herein by reference.

The FIGS. 7 and 8 indicate the use of respective forward and rear U-shaped lift bars 37 and 38, each having lift bar side legs 39, with the lift bar side legs 39 pivotally mounted relative to an adjacent and respective side wall 12. The lift bar side legs 39 each include a side leg pivot axle 40 pivotally mounting the side legs to a respective side wall 12, with a side wall opening 41 directed in each side wall below respective side leg pivot axle 40. A lock pin 42 is directed through a side leg aperture 43 directed into the side leg 39 below the pivot axle, wherein the lock pin is received through the side leg aperture 43 and into an associated side wall opening 41 to permit securing of the lift bars in a lowered orientation substantially orthogonally relative to the floor 11, in a manner as illustrated in FIG. 8, to provide for stationary securement of the stroller apparatus as well as further simulating the raising of a race car structure for entertainment and amusement purposes.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An infant stroller apparatus, comprising, a stroller floor, the floor including spaced parallel side walls extending upwardly and orthogonally relative to the stroller floor, with the side walls arranged in a parallel coextensive relationship, and a matrix of ventilation apertures directed through each of said side walls, and each side wall of said side walls includes a side wall scoop, and each of said side walls further includes a side wall housing, with each side wall housing including a respective scoop directed therethrough, with each said respective scoop including a respective entrance opening directed into each said respective scoop into each said respective side wall housing in pneumatic communication with one of said matrix of ventilation apertures, and front wheels mounted rotatably to the side walls, and rear wheels rotatably mounted to the side walls rearwardly of the front wheels, and a forward cowl extending along the side walls from a forward distal end of the floor, and a stroller seat mounted on the floor adjacent the cowl, and handle legs mounted to the side walls, with one of said handle legs mounted to each of said side walls rearwardly of the stroller seat, and the floor includes a plurality of caster wheels, one of said caster wheels positioned in adjacency relative to one of said front wheels, with the caster wheels extending below the front wheels to permit ease of steerage, and the stroller seat includes a stroller seat bottom fixedly mounted to the floor, and a stroller seat back, the stroller seat back includes back hinges hingedly mounting the stroller seat back to the floor, and at least one linkage assembly mounted to the stroller seat back, the linkage assembly includes a linkage first leg, the first leg having a first leg forward distal end hingedly mounted to the seat back, and the linkage first leg including a first leg rear distal end, and a linkage second leg pivotally mounted to the linkage first leg at the linkage first leg rear distal end, and a linkage second leg extending rearwardly of the linkage first leg, and at least one pivot head, the pivot head including the linkage second leg received therewithin, and the pivot head including a resilient axle directed therethrough, the resilient axle receiving the linkage second leg and mounting a lower distal end of one of said handle legs.

2. An apparatus as set forth in claim 1 with an annular array of apertures directed about the resilient axle, and a first lock pin directed into one of said apertures and received through one of said handle legs, and a second lock pin directed through a further one of said apertures received in the linkage second leg.

3. An apparatus as set forth in claim 2 wherein each handle leg includes a handle leg cross brace, the handle leg cross brace externally threaded, and an internally threaded sleeve, the internally threaded sleeve receiving the cross braces therewithin to permit adjustment of the cross braces relative to the sleeve.

4. An apparatus as set forth in claim 3 including a forward U-shaped lift bar pivotally mounted to the side walls forwardly of the forward wheels, with the forward U-shaped lift bar including lift bar side legs, the lift bar side legs oriented parallel relative to one another, and the lift bar side legs each including a side leg pivot axle orthogonally directed into one of said side walls, and each side leg including a side leg aperture directed below the side leg pivot axle, and each side wall including a side wall opening, and a lock pin arranged for reception through said side wall opening and said side leg aperture to secure said forward U-shaped lift bar in a lowered first position.

* * * * *